W. L. NEWTON.
NUT LOCK.
APPLICATION FILED MAY 12, 1917.

1,296,003.

Patented Mar. 4, 1919.

Inventor
W. L. Newton.

Witnesses

UNITED STATES PATENT OFFICE.

WILL L. NEWTON, OF COLUMBUS, OHIO, ASSIGNOR OF FOUR-TENTHS TO HUGH C. TYLER, OF COLUMBUS, OHIO.

NUT-LOCK.

1,296,003.   Specification of Letters Patent.   Patented Mar. 4, 1919.

Application filed May 12, 1917. Serial No. 168,197.

*To all whom it may concern:*

Be it known that I, WILL LOWRIE NEWTON, a citizen of the United States, residing at Columbus, in the county of Franklin and State of Ohio, have invented certain new and useful Improvements in Nut-Locks; and I do hereby declare the following to be a full, clear, and exact description of the invention, such as will enable others skilled in the art to which it appertains to make and use the same.

This invention has for its objects to provide a simple and efficient nut lock in which the nut is held in various adjusted positions by an inexpensive locking element having screw threads pitched oppositely to those of the bolt and fitting within an axial recess formed in the latter.

Another object is the provision of a nut lock which permits wide range and accurate adjustment of the nut upon the threaded portion of the bolt.

With these and other objects in view, the invention consists in the novel construction, combination and arrangement of parts as will be hereinafter specifically described, claimed and illustrated in the accompanying drawing, in which:

Figure 1:
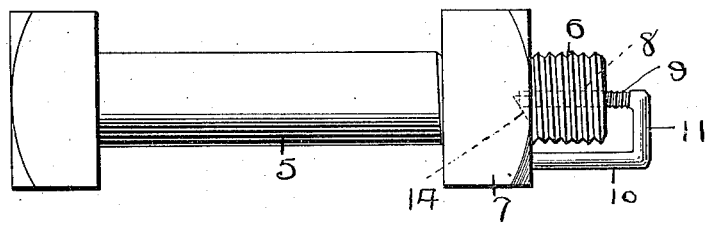
Figure 1 represents a plan view of the improved nut lock.
Figure 2:
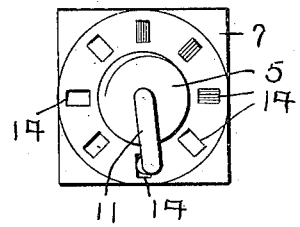
Fig. 2 represents an end elevation thereof.
Figure 3:
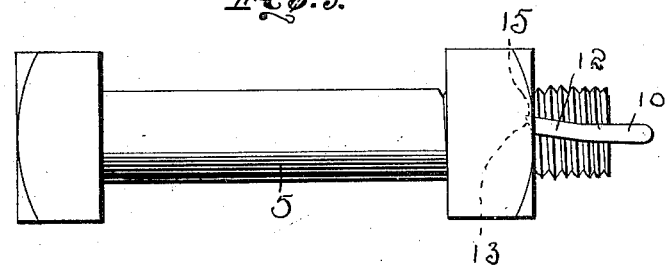
Fig. 3 represents a side elevation of the improved nut lock.

Referring to the drawing in detail, wherein similar reference numerals designate corresponding parts throughout the several views, the numeral 5 indicates a preferred type of bolt, having an externally screw threaded terminal 6 on which a nut 7 is fitted.

In adapting the improved nut lock to the bolt the only modification in the construction of the latter which is necessary is the provision of an axial recess 8 in the bolt, which is formed with internal screw threads pitched oppositely to the screw threads 6 formed externally of the bolt. The locking element, which is substantially U-shaped, includes two leg members 9 and 10 and a connecting web 11. The leg 9 is formed with screw threads fitting the threaded recess 8 in the bolt. The other leg 10 is disposed in parallel relation to the center leg 9 and overlies the threaded terminal 6 of the bolt.

The inner end, or that end of the leg 10 which is disposed adjacent the nut 7, is slightly inclined or laterally deflected, as indicated at 12, and is provided with a beveled terminal 13 adapted to engage the outer face of the nut 7. When adjusting the nut lock, the nut 7 is first advanced to a secure position against the object and the locking element 11 is rotated independently of the nut until the inner terminal 13 is engaged with the face of the nut. The turning is continued by force until the lock is preferably tight and secure, it being retained in such position by the resistance of its own natural resiliency and the beveled terminal engaging the face of the nut.

In the preferred embodiment of the invention the nut 7 is preferably provided with circular, continuous, successive recesses 14 not over one thirty-secondth of an inch deep, which are substantially V-shaped to provide shoulders 15 behind which the beveled terminal 13 of the locking element engages to prevent rotary movement of the nut in one direction with relation to the lock element and thereby establish a non-rotatable connection between the parts.

What I claim is:

1. A nut lock comprising, a bolt having exterior screw threads and provided with an axial cylindrical opening in its forward end portion, said axial opening having screw threads pitched opposite to the screw threads on the exterior of the bolt; a nut arranged on the bolt and provided in its outer face with radial V-shaped grooves; and a U-shaped locking element having one arm thereof in threaded engagement with the interior screw threads of said axial opening and having its outer arm engaging the V-shaped grooves of said nut.

2. A locking nut comprising, a bolt having exterior screw threads and provided with an axial cylindrical opening in its forward end portion, said cylindrical opening being provided with screw threads; a nut arranged on the bolt and provided with radial V-shaped grooves in its outer face thereof; and a U-shaped locking element having one arm thereof in threaded engagement with the interior screw threads of said axial opening and having its outer arm provided with a slight longitudinal curve and a beveled terminal portion adapted for engagement with the radial grooves in said nut.

In testimony whereof I affix my signature in presence of two witnesses.

WILL L. NEWTON.

Witnesses:
 GEO. E. CRUICKSHANK,
 W. E. HASSEY.